3,845,005
COATING COMPOSITION

Aaron Freiman, Brooklyn, N.Y., assignor to M & T Chemicals Inc., Greenwich, Conn.
No Drawing. Continuation-in-part of abandoned application Ser. No. 254,605, May 18, 1972. This application June 4, 1973, Ser. No. 366,539
Int. Cl. C08c 11/22, 11/64; C09d 5/16
U.S. Cl. 260—33.6 A          6 Claims

ABSTRACT OF THE DISCLOSURE

Triorganotin phenoxides impart anti-fouling properties to coating compositions containing a crosslinkable liquid hydrocarbon polymer without adversely affecting the curing of the polymer, as do other liquid triorganotin derivatives, particularly bis(triorganotin) oxides.

BACKGROUND

This application is a continuation-in-part of application Ser. No. 254,605, filed May 18, 1972 and now abandoned.

This invention relates to liquid antifouling coating compositions containing a triorganotin compound wherein the film-forming component is a crosslinkable liquid hydrocarbon rubber. This invention further relates to improved antifouling coating compositions wherein the active toxicant is an organotin compound which does not interfere with the curing of the liquid hydrocarbon rubber that comprises the film-forming component of the coating compositions.

Conventional antifouling coating compositions contain a film-forming and relatively water insensitive polymer dissolved or dispersed in a suitable organic liquid, a pigment, a toxicant and various additives to improve the storage stability of the composition and make it easier to apply. The film-forming polymer is often a copolymer of vinyl chloride or an ester of acrylic or methacrylic acid. Coatings obtained using these polymers are not completely satisfactory for a number of reasons, including insufficient water permeability, poor adhesion to the substrate and susceptibility to hydrolysis, all of which detract from the performance of the final antifouling coating. Rubber would be a most desirable coating material in which to incorporate toxicants, since it is resistant to hydrolysis yet is sufficiently permeable to permit the gradual migration of toxicant from the interior to the surface of the coating. The migration of toxicant is required to obtain long-term antifouling activity. U.S. Pat. 3,426,473 teaches that sheets of rubber containing bis(tri-n-butyltin) oxide can be adhered to surfaces exposed to a marine environment. This method for imparting antifouling properties would not be practical for use on large ocean-going vessels because of the large and irregularly shaped surfaces which must be protected.

Numerous triorganotin compounds have been incorporated into both natural and synthetic rubbers with the objective of achieving gradual release of the organotin compound into an aqueous environment over extended periods of time for the purpose of killing or repelling fouling and disease-carrying organisms in the area on or immediately surrounding the rubber. U.S. Pat. No. 3,417,181 discloses a number of tripropyl- and tributyltin derivatives which are effective in this application, including chlorides, oxides, fluorides, carboxylates, hydrides and resinates. The oxides are particularly preferred. All of these compounds may be useful when incorporated into formulations containing solid rubbers; however, many of them, including bis(tri-n-butyltin) oxide are unsuitable for use with recently developed low molecular weight synthetic rubbers which are liquid at ambient temperature. It is now possible to prepare low molecular weight hydrocarbon rubbers which can be formulated into liquid compositions and subsequently cured using a variety of catalysts to yield solid coatings. The liquid rubbers offer a considerable advantage with respect to their higher molecular weight, solid homologs. The former are readily incorporated into relatively low viscosity coating compositions which can be applied using conventional techniques including brushing and spraying.

Particularly preferred liquid rubbers are copolymers of isobutylene with minor amounts of isoprene that exhibit an average molecular weight of about 32,000 and contain an average of about seven carbon-carbon double bonds per molecule.

Attempts to prepare antifouling coating compositions using a liquid rubber as the film-forming polymer in combination with conventional organotin toxicants such as bis(tri-n-butyltin) oxide and tri-n-butyltin fluoride were unsuccessful, since these compounds were found to inhibit curing of the liquid rubber. It is therefore considered surprising that tributyl- and tripropyltin phenoxides are unique among triorganotin compounds in that they do not interfere with the curing of liquid butyl rubbers and impart acceptable levels of antifouling performance to the resultant coating.

SUMMARY OF THE INVENTION

This invention provides improved liquid antifouling coating compositions comprising between 20 and 40%, based on the weight of said coating, of a solubilized crosslinkable hydrocarbon rubber containing an average of at least one carbon-carbon double bond per molecule, between 1 and 10%, based on the weight of said rubber, of a crosslinking catalyst for the rubber, an oxidizing agent, and a triorganotin compound, wherein the improvement resides in the presence of a solubilized liquid hydrocarbon rubber and between 5 and 15%, based on the weight of the composition, of at least one liquid triorganotin compound exhibiting the general formula R₃SnX wherein each R is individually selected from the group consisting of hydrocarbon radicals containing three and four carbon atoms and phenyl radicals, and X represents a phenoxy radical which may contain at least one inert substituent selected from the group consisting of halogen atoms and aryl hydrocarbon radicals. The concentration of solubilized rubber is between 40 and 80%, based on the combined weight of rubber and solvent and the weight ratio of oxidizing agent to catalyst is between 2:1 and 5:1, respectively.

DETAILED DESCRIPTION OF THE INVENTION

1. The organotin toxicant

Tributyl- and tripropyltin derivatives of phenols and certain substituted phenols effectively kill and/or repel barnacles and other organisms responsible for fouling without interfering with the catalyzed curing of liquid rubber compositions.

Triorganotin compounds suitable for incorporation into coating formulations containing one or more crosslinkable liquid rubbers exhibit the general formula R₃SnX wherein each R is individually selected from alkyl radicals containing three or four carbon atoms and phenyl radicals. X represents a phenoxy

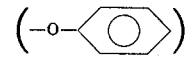

radical which may contain up to five substituents selected from aryl hydrocarbon radicals and halogen atoms. Preferred organotin compounds are tri-n-butyltin derivatives of chlorinated phenols. The concentration of organotin compound is between about 5 and 15%, based on the total weight of the formulation.

2. Curing catalysts for the liquid rubber component

The coating compositions of this invention are cured, i.e. crosslinked, to yield solid products using a variety of catalysts. The type and concentration of catalyst selected will be determined at least in part by the desired curing temperature and the rate of cure. A preferred catalyst for use at ambient temperatures is p-quinone dioxime, which is employed in combination with a suitable oxidizing agent such as lead dioxide, manganese dioxide or organic peroxides, e.g. t-butyl perbenzoate and cobalt naphthenate. The particle size of the oxidizing agent has been shown to have an effect on the cure rate.

The liquid rubber will begin to cure in the presence of a combination of catalyst with oxidizer, and it may therefore be desirable to add the oxidizing agent just prior to applying the coating formulation. When lead oxide is employed as the oxidizer, it has been found convenient to incorporate this material into a paste which also contains a fatty acid such as stearic acid and a phthalate ester which is used as a plasticizer.

The optimum concentration of catalyst and oxidizing agent are determined by the desired curing speed. Usually the concentration of catalyst will be between about 1 and 10% based on the weight of the liquid rubber, and the oxidizing agent will be present in an amount between about 2 and 5 times the weight of the catalyst.

3. Optional ingredients in the coating formulation

In addition to the liquid rubber, triorganotin compound and catalyst the coating compositions may contain other components to facilitate application of the coating or to modify one or more properties of the final product. The optional ingredients include fillers, dyes and pigments.

Some of the preferred coating compositions are described in the following examples, which should not be interpreted as limiting the scope of this invention. All parts are by weight unless otherwise specified.

EXAMPLE 1

To 30 parts of a mixture containing 360 parts of a liquid isobutylene-isoprene copolymer (LM Butyl 504, manufactured by the Enjay Chemical Company), 480 parts of xylene, 2.4 parts of p-quinone dioxime and 3 parts of a standard curing accelerator comprising a 1:1 weight ratio mixture of N,N-dimethylformamide and glacial acetic acid was added (1) 3.3 parts of a paste containing 3.25 parts lead dioxide, 0.33 parts stearic acid and 2.92 parts dibutyl phthalate and (2) 3.3 parts of a liquid organotin compound. The resultant compositions were thoroughly blended for a few minutes and then coated as films on glass plates. The coated plates were allowed to stand for about 16–20 hours at ambient temperature after which the films were examined to determine the amount of curing that had occurred. The results of the examination are summarized in the following table.

TABLE I

| Organotin compound: | Degree of curing |
|---|---|
| Bis TBT [1] oxide | Poor. |
| TBT 2,4,6-trichlorophenoxide | Complete [3]. |
| TBT pentachlorophenoxide | Do. |
| TBT o-phenylphenoxide | Do. |
| TBT (4-methylthio) phenoxide | Poor. |
| TBT dimethyldithiocarbamate | Do. |
| TBT dimercaptothiadiazole | Do. |
| TBT methylmercaptothiadiazole | Do. |
| Bis(Tri-n-propyltin) oxide | Do. |
| TNP [2] pentachlorophenoxide | Complete [3]. |
| TNP o-phenylphenoxide | Do. |

[1] TBT=tri-n-butyltin.
[2] TNP=tri-n-propyltin.
[3] Degree of curing equivalent to a control formulation which did not contain an organotin compound.

EXAMPLE 2

A comparison of the compatibility of bis(tri-n-butyltin) oxide and tri-n-butyltin 2,4,6-trichlorophenate in liquid rubber formulations To 90 parts of a mixture containing 600 parts of a xylene solution containing 60% by weight of the butylene-isoprene copolymer described in Example 1, 240 parts of xylene, 24 parts of p-quinone dioxime and 3 parts of a 1:1 weight ratio mixture of N,N-dimethyl formamide and glacial acetic acid were added 10 parts of the paste described in Example 1 and 10 parts of either bis(tri-n-butyltin) oxide or tri-n-butyltin 2,4,6-trichlorophenate. A third formulation was prepared without any tin compound. Each of the formulations were applied to steel panels using a paint brush. After about 24 hours of exposure in air at ambient temperatures the formulations containing no tin compound and the trichlorophenate appeared to be properly and equally cured in that they were dry and only slightly "tacky" to the touch. The formulation containing the bis(tri-n-butyltin) oxide was considerably more "tacky" than the other two samples and had a film of a brown liquid on top of the rubber layer, an indication that at least a portion of the tin compound had exuded from the surface of the liquid rubber.

EXAMPLE 3

Preparation and evaluation of anti-fouling coatings containing liquid rubber and a triorganotin compound A composition was prepared by combining and thoroughly blending together the following components:

(1) 100 parts of a 60% by weight liquid isobutylene-isoprene copolymer solution in xylene
(2) 40 parts of xylene
(3) 4 parts of p-quinone dioxime Ninety parts of the resultant mixture were combined with (1) 10 parts of carbon black (2) seven parts of a paste containing 3.25 parts lead dioxide, 0.33 parts stearic acid and 2.92 parts dibutyl phthalate and (3) 10 parts of tri-n-butyltin pentachlorophenate.

The foregoing coating formulation was evaluated for anti-fouling performance by applying two coats of the formulation (each coat being between 5.1 and $64 \times 10^{-3}$ cm. thick) to both major surfaces of a 6 x 16 inch (10 x 40 cm.) fiberglass-reinforced polyester panel which had previously been sanded to obtain a roughened surface. After the coating had cured, the panels were immersed in Biscayne Bay at Miami Beach. Fla. The conditions in this area are particularly conducive to the development of fouling organisms. The panel was secured to a raft such that only the upper ⅓ of the panel was above the water line at all times.

The panel was withdrawn at monthly intervals, inspected and the anti-fouling performance rated by observing the number of barnacles present. At the end of a five month period the most fouled surface of the panel exhibited only seven barnacles. By comparison, a panel coated with an identical formulation with the exception that the organotin compound was absent exhibited 79 barnacles after one month's exposure and over 100 following three months' exposure.

What is claimed is:
1. An improved liquid coating composition comprising between 20 and 40%, based on the weight of the composition, of a solubilized crosslinkable hydrocarbon rubber containing an average of at least one carbon-carbon double bond per molecule of rubber, between 1 and 10%, based on the weight of said rubber, of a crosslinking catalyst, an oxidizing agent for the catalyst and between 5 and 15%, based on the weight of said coating composition, of a triorganotin compound wherein the improvement resides in the presence of a liquid isobutylene-isoprene copolymer rubber and at least one liquid triorgano- tin compound exhibiting the general formula $R_3SnX$ wherein each R is individually selected from the group consisting of alkyl radicals containing 3 and 4 carbon atoms and phenyl radicals, and X represents a phenoxy radical which may contain at least one inert substituent selected from the group consisting of halogen atoms and aryl hydrocarbon radicals, with the proviso that the concentration of the solubilized rubber is between 40 and 80%, based on the combined weight of rubber and solvent, and the weight ratio of oxidizing agent to catalyst is between 2:1 and 5:1, respectively.

2. The improved coating composition of Claim 1 wherein each R represents an n-butyl radical and X represents a substituted phenoxy radical wherein the substituents other than hydrogen comprise between 1 and 5 chlorine atoms, inclusive.

3. The improved coating composition of Claim 1 wherein the crosslinking catalyst is p-quinone dioxime and the oxidizing agent is lead dioxide.

4. The improved coating composition of Claim 1 wherein at least one pigment or extender is present in the composition.

5. The improved coating composition of Claim 1 wherein the solvent for the rubber is a liquid aromatic hydrocarbon as a solvent for the liquid hydrocarbon rubber.

6. The improved coating composition of Claim 1 wherein the liquid hydrocarbon rubber comprises a copolymer of isobutylene and isoprene.

References Cited

UNITED STATES PATENTS

| | | | |
|---|---|---|---|
| 3,417,181 | 12/1968 | Cardarelli | 106—15 AF |
| 3,426,473 | 2/1969 | Cardarelli et al. | 106—15 AF |
| 3,284,296 | 11/1966 | Freiberg | 424—258 |
| 3,524,869 | 8/1970 | Minieri | 260—429.7 |
| 3,642,501 | 2/1972 | Minieri | 260—45.75 K |

OTHER REFERENCES

Adhesives Age, September 1968, pp. 30–31.
Minieri: Chem. Abs. 72, 99508t (May 11, 1970).

ALLAN LIEBERMAN, Primary Examiner

H. H. FLETCHER, Assistant Examiner

U.S. Cl. X.R.

106—15 AF; 260—23.7 B, 23.7 M, 31.8 DR, 31.8 H, 45.75 K

UNITED STATES PATENT OFFICE
CERTIFICATE OF CORRECTION

Patent No. 3,845,005   Dated October 29, 1974

Inventor(s)  Aaron Freiman

It is certified that error appears in the above-identified patent and that said Letters Patent are hereby corrected as shown below:

Claim 5 line 3 - Delete "as a solvent for the liquid hydrocarbon rubber".

Signed and sealed this 18th day of March 1975.

(SEAL)
Attest:

RUTH C. MASON
Attesting Officer

C. MARSHALL DANN
Commissioner of Patents
and Trademarks